United States Patent [19]

Merkert

[11] 4,395,285

[45] Jul. 26, 1983

[54] LOW DENSITY COMPACTS OF PREPARED MIX FOR USE IN THE PRODUCTION OF SILICON AND FERROSILICON

[75] Inventor: Rodney F. Merkert, Buffalo, N.Y.

[73] Assignee: Elkem Metals Company, Pittsburgh, Pa.

[21] Appl. No.: 304,652

[22] Filed: Sep. 23, 1981

Related U.S. Application Data

[62] Division of Ser. No. 134,205, Mar. 26, 1980, Pat. No. 4,309,216.

[51] Int. Cl.³ .............................................. C22B 9/10
[52] U.S. Cl. ........................................ 75/256; 75/1 R; 75/129

[58] Field of Search .................. 75/10 R, 25, 11, 3-5, 75/1 R, 256; 266/176, 177

[56] References Cited

U.S. PATENT DOCUMENTS

| | | | |
|---|---|---|---|
| 3,153,587 | 10/1964 | Schuerger | 75/5 |
| 3,215,522 | 11/1965 | Kuhlmann | 75/10 R |
| 3,660,298 | 5/1972 | McClincy | 252/188.3 |
| 3,704,114 | 11/1972 | Wilson | 75/3 |

Primary Examiner—P. D. Rosenberg
Attorney, Agent, or Firm—Eyre, Mann, Lucas & Just

[57] ABSTRACT

A low density, porous compact of prepared mix containing silica fume, finely-divided carbonaceous reducing agent such as petroleum coke or coal, optionally iron and a binder.

8 Claims, 2 Drawing Figures

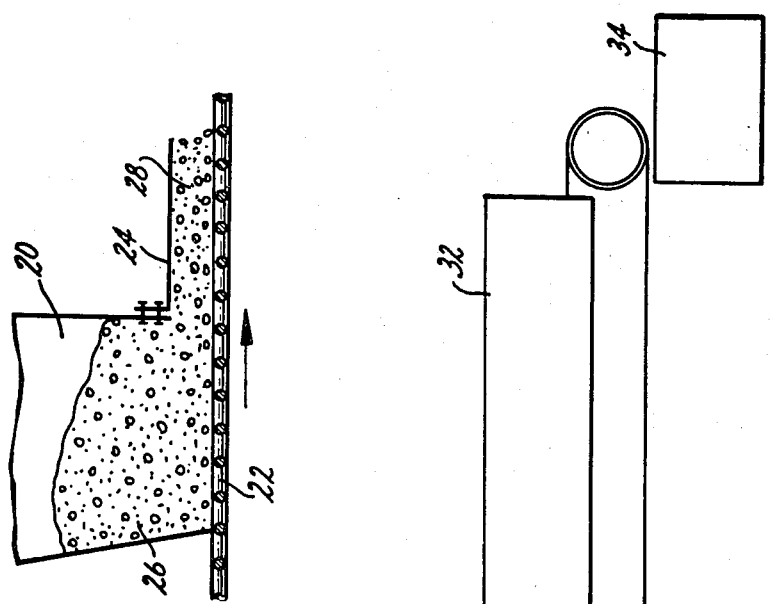
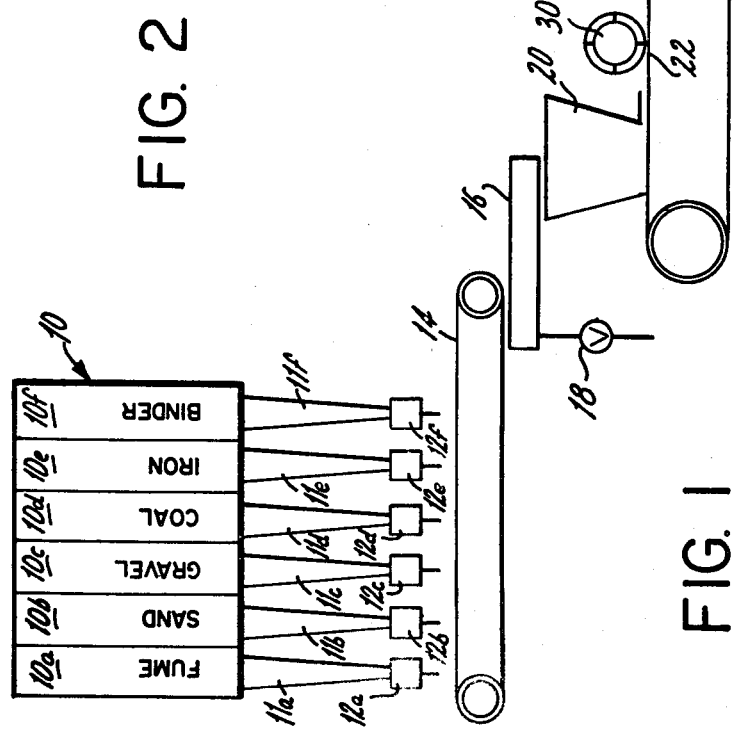

LOW DENSITY COMPACTS OF PREPARED MIX FOR USE IN THE PRODUCTION OF SILICON AND FERROSILICON

This application is a division of our prior U.S. application Ser. No. 134,205, filing date Mar. 26, 1980 now U.S. Pat. No. 4,309,216.

The present invention relates generally to the production of silicon and ferrosilicon and more particularly to low density, porous compacts of prepared mix for use as the feed to an electric furnace for producing the same, and to a method of making such compacts.

Silicon and ferrosilicon are conventionally produced by feeding a silica-containing material and a carbonaceous reducing agent such as coke or coal, together with metallic iron in the case of ferrosilicon, to a submerged arc electric furnace. The heat generated by the submerged arc is sufficient to effect reduction of the silica ($SiO_2$) to yield silicon or ferrosilicon. In the past, it has been customary to employ rather large or "lump" size raw materials as the feed to the electric furnace. Unfortunately, these raw materials are today becoming more difficult to obtain and are more expensive. Consequently, it is important to be able to use finer size raw materials in the production of silicon and ferrosilicon which are cheaper and more easily obtained. However, these finer size raw materials must be used in a compacted form. Preferably, the compacts contain all of the materials in the furnace charge in the proper proportion to carry out the reduction reaction. It has been found that for best results the compacts of prepared mix should have a low apparent density, low bulk density and a high internal porosity. In addition, the compacts should have an irregular shape and rough surfaces and should be strong enough to be handled without breakage or deterioration.

Various attempts have been made to prepare low density compacts having the above mentioned properties but so far none have proven altogether successful. For instance, a prepared mix containing finely-divided raw materials, e.g. silica-containing material, carbonaceous reducing agent and a binder, have been molded into the shape of briquets or pellets. However, these briquets or pellets do not meet all of the requirements of the low density compacts, i.e. they are less porous and possess a relatively high apparent density and a high bulk density. In addition, the briquets or pellets are of regular shape and have a fairly smooth surface which is undesirable. It has also been proposed to extrude the prepared mix into compacts of various shapes but these compacts also do not meet all of the requirements. For example, the prepared mix may be easily extruded into the form of a cylinder; however, a cylinder has a regular shape and smooth surfaces. Moreover, the extrusion process is often-times difficult to control and produces articles of fairly high density.

It is therefore an important object of the present invention to provide low density, porous compacts of prepared mix for use as the feed to an electric furnace for producing silicon and ferrosilicon.

Another object of the present invention is to provide a method of making such low density, porous compacts from finely-divided raw materials which method is very easy to operate and control.

The foregoing and other related objects and advantages of the present invention are achieved by a low density, porous compact of prepared mix containing silica fume, finely-divided carbonaceous reducing agent such as petroleum coke or coal, optionally iron, and a binder, the silica and carbon being present in appropriate stoichiometric quantities for carrying out the reduction reaction:

$$SiO_2 + 2C \rightarrow SI + 2CO.$$

The term "silica fume" as used herein and in the appended claims means a very finely-divided, amorphous silica which is produced in an electric furnace as a by-product of the reduction of silica to produce silicon or ferrosilicon. Silica fume is usually recovered from the furance in a finely-divided state having a particle size of less than about 0.5 microns ($5 \times 10^{-4}$ mm).

The method of making the low density, porous compacts in accordance with the present invention comprises blending together silica fume alone or together with other finely-divided silica-containing material, a finely-divided carbonaceous reducing agent such as petroleum coke or coal, optionally iron, a binder and water to form a wet mix, depositing the wet mix substantially uniformly onto a flat surface in a thin layer, drying the deposited layer at elevated temperatures of about 200° C. to remove substantially all of the water present and then breaking the dried layer into pieces of various sizes and shapes. The blended mix should contain silica and carbon in the required stoichiometric proportions, i.e. approximately 2.5 parts silica to 1 part carbon.

The present invention will now be described in greater detail with particular reference to a preferred embodiment thereof which is illustrated in the accompanying drawing, in which FIG. 1 is a schematic representation of an apparatus used in the method of making low density, porous compacts in accordance with the present invention; and FIG. 2 is a vertical sectional view of a part of the apparatus of FIG. 1 showing the manner in which the wet mix is deposited in the form of a thin layer on a continuously moving belt.

Referring now to the drawing in detail, there is shown in FIG. 1 an apparatus for making low density, porous compacts of prepared mix including a storage bin 10. The bin 10 is divided into separate compartments, for example, six compartments 10a–10f for storing in each compartment the silica fume, silica sand, silica gravel, coal, particulate iron (mill scale) and a cereal binder, respectively. The finely-divided raw materials in the storage bin 10 are individually dispensed through chutes 11a–11f to automatic scales 12a–12f where the materials are individually and simultaneously weighed and fed to a common conveyor 14. The raw materials are then fed from the conveyor 14 to the back end of a continuous pug-mill 16. Water is added to the pug-mill 16 also starting at the back end through a metering device as at 18.

The pug-mill 16 is sized to produce a wet mix having the consistency of pouring concrete. The mix exits the discharge end of the pug-mill 16 and is fed into a bin 20. The bin 20 has an open bottom end which is located just above a continuously moving, flexible, porous wire belt 22. The bin 20 is also equipped with an adjustable dam 24 mounted on the downstream side thereof. As more clearly shown in FIG. 2, the mix 26 is fed through the bin 20 onto the belt 22 and is carried by the belt through a discharge opening located near the bottom of the bin. The mix is spread evenly in a thin uniform layer 28

(approximately 1 or 2 inches thick) by the adjustable dam 24. The wet mix passes from the belt 22 to a rotary slotter and cutter 30 which divides the mix layer up into precut segments. The wet mix then passes through the dryer 32 where the mix is heated to elevated temperatures of at least 200° C. to remove water. The dried, precut pancake mix is carried by the belt 22 through the discharge end of the dryer 32 where the mix or pancake is broken up into various sizes and shapes either by its own weight as it leaves the belt 22 or by some mechanical device. The pieces are then collected in storage compartment 34.

Typical prepared mixes for making the low density porous compacts are as follows:

| Mix Ingredients | Mix Proportions (Approx. parts by weight per 100 parts by weight of silica) |
|---|---|
| Silica Fume | 25–100 |
| Silica Sand | 0–75 |
| Silica Gravel | 0–75 |
| Carbon | 40 |
| Iron Particles | 0–15 |
| Cereal | 2.5 |
| Water | 50 |

In addition to its irregular shape, the porous compacts possess the following physical characteristics: low apparent density of between about 0.8 and 1.2 grams per cubic centimeter, preferably between 1 and 1.2 grams per cubic centimeter; low bulk density of between about 25 and 40 pounds per cubic foot, preferably between 30 and 35 pounds per cubic foot; and a high internal porosity of between about 50 and 60% voids, preferably about 56% voids.

In the practice of the present invention, any finely-divided silica-containing material may be used together with the silica fume such as, for example, silica sand and Sidley gravel (silica gravel). Generally, the silica-containing material should have a particle size in the range of between about $5 \times 10^{-4}$ and 6.4 mm. Silica sand has an average particle size of between about 0.15 and 0.6 mm while Sidley gravel has a particle size of between about 2.4 mm $\times$ 6.4 mm.

The carbonaceous reducing agent used in the prepared mix may be either petroleum coke or finely-divided coal such as Quinwood Slack coal, for example. Generally, the carbonaceous reducing agent is used in an amount such that the total carbon ranges from about 35 to 50 parts by weight of the total silica. The particle size of the carbonaceous material may range from between about 9.5 mm $\times$ D and 6.4 mm $\times$ D.

When it is desired to produce the ferrosilicon alloy, the low density compacts are made from a prepared mix including iron particles such as mill scale or the like. Again, the iron particles should be of a relatively small size approximately 2.4 mm $\times$ D.

The binder used in the prepared mix should be a binder material which is non-contaminating in the environment of the electric furnace. Suitable binders are cereal binders such as corn starch, e.g. Mogul binder. A bulking agent may also be used in the mix if desired such as sawdust, for example.

In order to demonstrate the effectiveness of the present invention, a number of low density, porous compacts were prepared from different mix compositions and tested. The mix compositions are given as follows:

TABLE I

| Mix Ingredients | Mix Proportions - parts by weight per 100 parts by weight of total silica | | | |
|---|---|---|---|---|
|  | Mix 1 | Mix 2 | Mix 3 | Mix 4 |
| Sidley Gravel | 50 | 25 |  | 50 |
| Silica Fume | 25 | 40 | 50 | 25 |
| Silica Sand | 25 | 35 | 50 | 25 |
| Pet Coke | 30 | 31 | 31 | 31.25 |
| Quinwood Slack Coal | 17 | 17.25 | 17.25 | 17.5 |
| Mill Scale | 15.5 | 15.5 | 15.5 | 15.5 |
| Sawdust | 10 |  |  |  |
| Mogul Binder | 2 | 2 | 2 | 2 |
| Water | 50 | 50 | 50 | 50 |

Cakes were made from each of the four compositions listed in Table I by casting the mix in thin layers approximately 1 to 2 inches thick on plywood sheets. The cast mix was then dried for 12 hours at 220° C. The dried mix was broken into random pieces and physical measurements were then taken and recorded. At the same time, a number of briquets were molded by conventional methods using the same four mix compositions above. A comparison of the physical characteristics of both the low density compacts and briquets are given in Table II below:

TABLE II

| Mix Shape | Bulk Density (lbs/ft³) | | | |
|---|---|---|---|---|
|  | Mix 1 | Mix 2 | Mix 3 | Mix 4 |
| Pancakes | 30 | 29.8 | 35.4 |  |
| Briquets |  | 58 | 56 | 63 |

What is claimed is:

1. Pieces of a low density, porous compact for use as the feed to an electric furnace in the production of silicon and ferrosilicon comprising finely-divided silica-containing material including at least about 25 parts by weight of silica fume per 100 parts by weight of total silica, and a finely-divided carbonaceous reducing agent in an amount such that the total carbon ranges from about 35 to 50 parts by weight carbon per 100 parts by weight of total silica; the compact having an apparent density of between about 0.8 and 1.2 grams per cubic centimeter, a bulk density of between about 25 and 40 pounds per cubic foot and an internal porosity of between about 50 and 60% voids.

2. A low density, porous compact according to claim 1 wherein the silica-containing material includes at least about 25 parts by weight of silica sand per 100 parts by weight of total silica.

3. A low density, porous compact according to claim 1 wherein the silica-containing material includes at least about 25 parts by weight of Sidley gravel per 100 parts by weight of total silica.

4. A low density, porous compact according to claim 1 wherein the carbonaceous reducing agent includes about 30 parts by weight of petroleum coke per 100 parts by weight of total silica.

5. A low density, porous compact according to claim 1 wherein the carbonaceous reducing agent includes about 17 parts by weight of coal per 100 parts by weight of total silica.

6. A low density, porous compact according to claim 1 further including up to about 15 parts by weight of iron particles per 100 parts by weight of total silica.

7. A low density, porous compact according to claim 1 further including up to about 2.5 parts by weight of a cereal binder per 100 parts by weight of total silica.

8. Pieces of a low density, porous compact for use as the feed to an electric furnace in the production of silicon and ferrosilicon comprising a finely-divided silica-containing material including from about 25 to 50 parts by weight each of silica fume, silica sand and Sidley gravel, about 30 parts by weight of petroleum coke, about 17 parts by weight of coal, from 0 to about 15 parts by weight of iron particles and about 2.5 parts by weight of a cereal binder, all based on 100 parts by weight of total silica; the compact having an apparent density of between about 1 and 1.2 grams of per cubic centimeter, a bulk density of between about 30 and 35 pounds per cubic foot, and an internal porosity of about 56% voids.

* * * * *

UNITED STATES PATENT AND TRADEMARK OFFICE
CERTIFICATE OF CORRECTION

PATENT NO. : 4,395,285
DATED : July 26, 1983
INVENTOR(S) : Rodney F. Merkert

It is certified that error appears in the above-identified patent and that said Letters Patent are hereby corrected as shown below:

Column 2, line 7, delete the chemical symbol "SI" and substitute therefor --Si--.

Column 6, line 5, after the word "grams", delete the word "of".

Signed and Sealed this

Eleventh Day of June 1985

[SEAL]

Attest:

DONALD J. QUIGG

Attesting Officer

Acting Commissioner of Patents and Trademarks